United States Patent [19]

Bütikofer

[11] Patent Number: 4,647,052

[45] Date of Patent: Mar. 3, 1987

[54] TOOL-HOLDING DEVICE AND TOOL SUPPORT

[75] Inventor: Willy Bütikofer, Nidau, Switzerland

[73] Assignee: Eugen Fabel, Buchrain, Switzerland

[21] Appl. No.: 654,116

[22] Filed: Sep. 25, 1984

[30] Foreign Application Priority Data

Sep. 30, 1983 [CH] Switzerland ............... 5340/83

[51] Int. Cl.$^4$ ............... B23B 31/04; B23B 27/10
[52] U.S. Cl. ............................. 279/83; 408/59; 408/239 A; 409/234
[58] Field of Search ............. 409/232, 231, 234; 408/239 R, 239 A, 59, 150, 180; 279/83, 1 A; 407/33, 34, 40, 42, 46, 47, 66, 101, 102, 107

[56] References Cited

U.S. PATENT DOCUMENTS

| | | |
|---|---|---|
| 1,412,469 | 4/1922 | Jimerson . |
| 2,283,514 | 5/1942 | Stanworth .............. 279/83 |
| 2,404,149 | 7/1946 | Trinkle .............. 409/231 X |
| 3,202,433 | 8/1965 | Davis .............. 409/232 X |
| 3,542,528 | 11/1970 | Bech .............. 407/40 X |
| 3,557,419 | 1/1971 | Flannery .............. 279/83 X |
| 3,628,290 | 12/1971 | Wilson et al. .............. 409/231 X |
| 3,811,694 | 5/1974 | Dahlman et al. .............. 279/83 |
| 4,133,545 | 1/1979 | Komori .............. 279/83 |
| 4,197,044 | 4/1980 | Cummings .............. 409/232 |
| 4,211,510 | 7/1980 | Hopkins .............. 408/150 X |
| 4,340,327 | 7/1982 | Martins .............. 408/59 |

FOREIGN PATENT DOCUMENTS

2848227 4/1980 Fed. Rep. of Germany .
537770 7/1973 Switzerland .

Primary Examiner—Gil Weidenfeld
Assistant Examiner—Steven C. Bishop
Attorney, Agent, or Firm—Oblon, Fisher, Spivak, McClelland & Maier

[57] ABSTRACT

A tool support, or an extension or reduction part holding a tool support, is held by its shank in an axial bore of a socket of the tool-holding device. The socket has one or more further bores, the longitudinal axes of which each form an angle of from 0° to about 5° with a straight line perpendicular to the longitudinal axis of the socket. A setscrew disposed in one such further bore cooperates by means of a beveled or faceted surface at its lower end with a chucking surface running on the outside of the shank at an angle to the longitudinal axis thereof. Another setscrew may cooperate with a second such chucking surface forming an angle of about 45° with the first chucking surface. Faultless force-locking and a bias are produced between the end faces of the socket and of the tool support, thus making it possible to combine even large, heavy boring tools with universally usable tool-holding devices inasmuch as there is sufficient resistance to torsional stress between the tool-holding device and the tool support.

18 Claims, 6 Drawing Figures

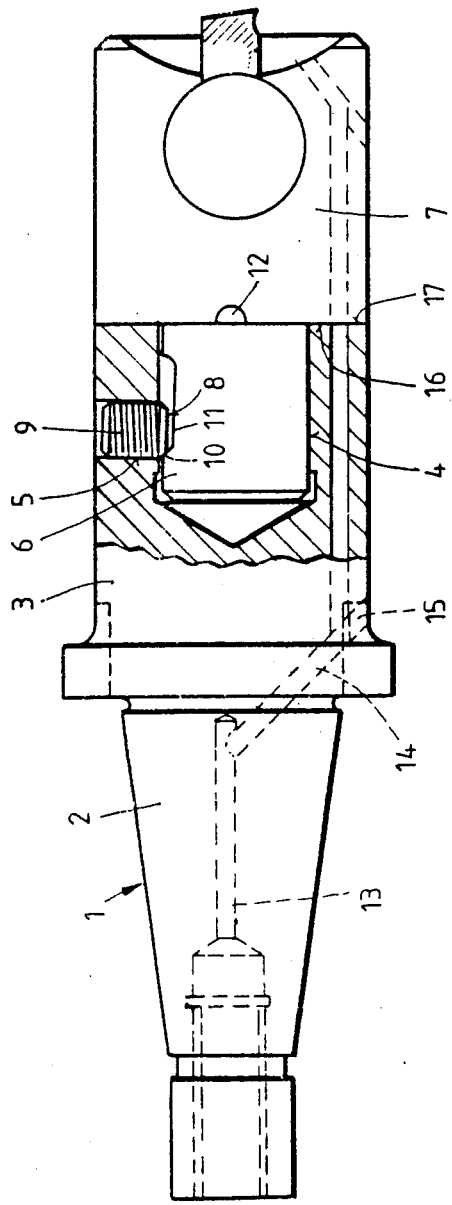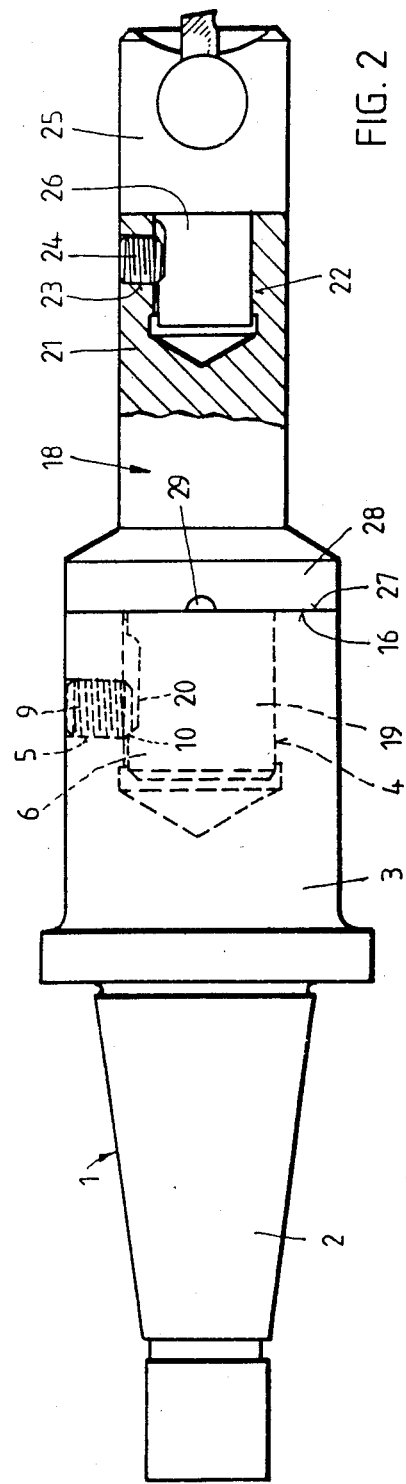

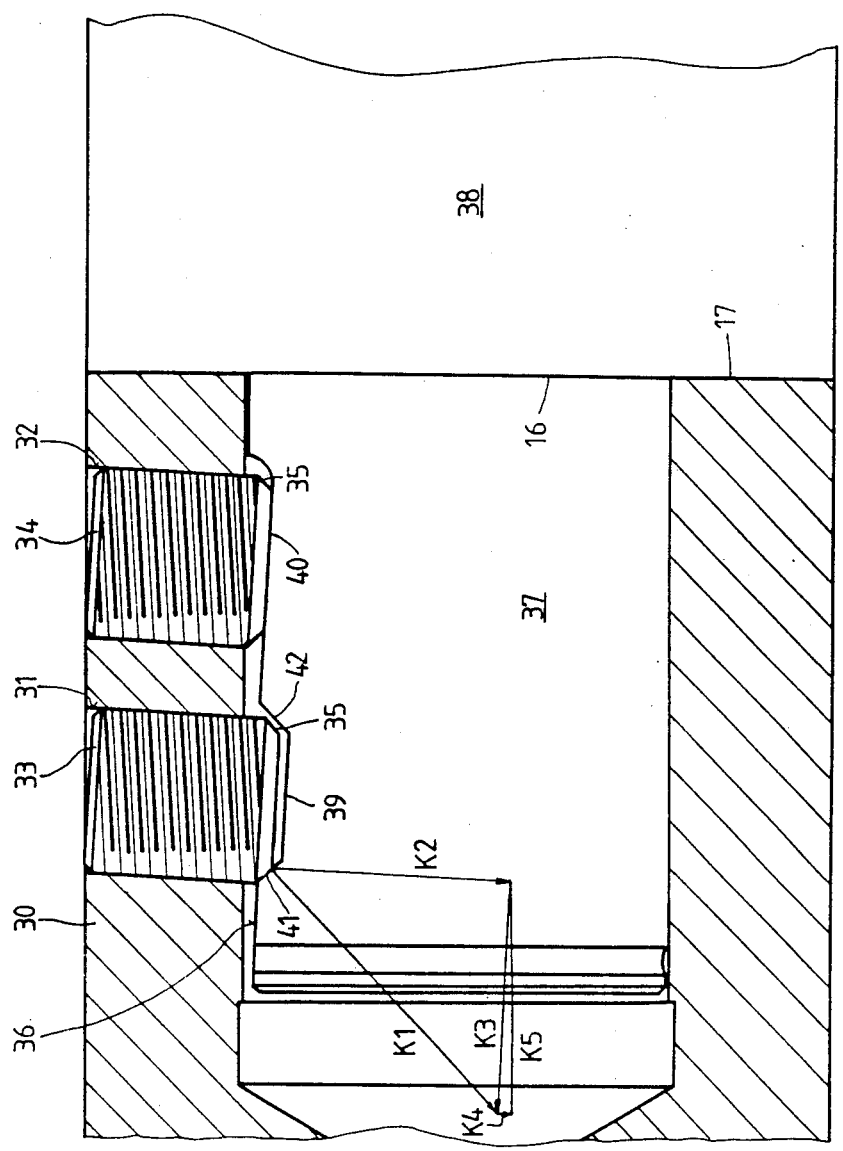

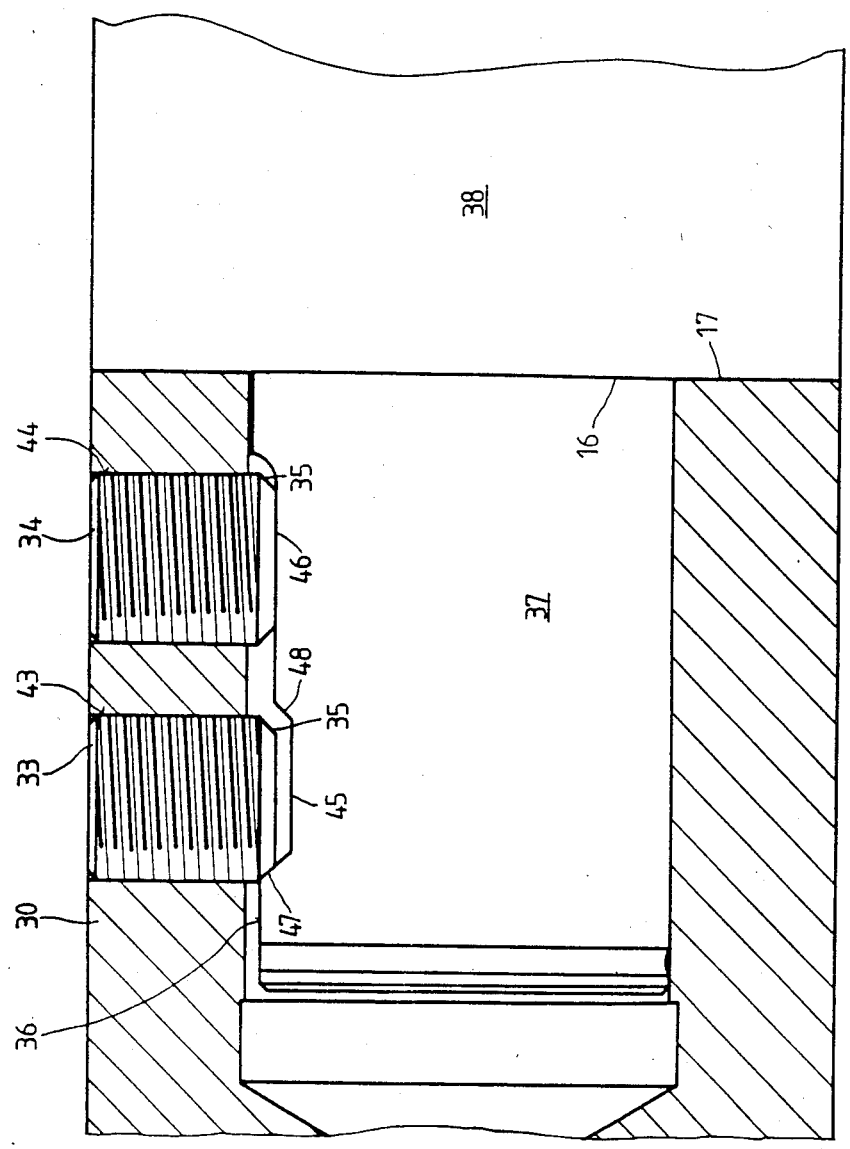

TOOL-HOLDING DEVICE AND TOOL SUPPORT

FIELD OF THE INVENTION

This invention relates to tool holders and chucking systems, and more particularly to a tool-holding device, as well as to a tool support and an extension or reduction part for use therewith.

The tool-holding device is of the type having a mounting portion and a socket connected thereto with a first bore for receiving a shank of a tool support and an end face, at least one second bore being provided in the wall of the socket for receiving a setscrew.

The tool support to be used with the aforementioned tool-holding device is of the type having an end face and a shank to be inserted in a bore of the device, the extension or reduction part being of the type which likewise has a shank to be inserted in a bore of the device and a socket having an end face and a first bore for receiving a tool support, there being at least one second bore provided in the wall of the socket for receiving a setscrew.

BACKGROUND OF THE INVENTION

With the previously proposed tool-holding and chucking devices, such as disclosed in Swiss Pat. No. 537,770, for example, it is hardly possible to utilize large, heavy tool supports combined with universally usable tool holders. Either the resistance to torsional stress of the proposed connections between the tool holder and the tool support is insufficient, or the type of holding does not allow exact positioning of the tools. Furthermore, when large tools are used, the stop screw may be sheared off.

OBJECTS OF THE INVENTION

It is an object of this invention to provide an improved tool-holding device with which tool supports of the most varied kinds can be used, with faultless force-locking and a non-vibrating connection between the tool holder and the tool support.

A further object of this invention is to provide an improved tool support and an improved extension or reduction part for use with a tool holder, whereby the first-mentioned object may likewise be achieved.

SUMMARY OF THE INVENTION

To this end, in the tool-holding device according to the present invention, of the type initially mentioned, the setscrew has a beveled or faceted surface at its lower end.

In both the tool support and the extension or reduction part according to the present invention, the improvement comprises a first chucking surface on the outside of the shank for cooperating with a setscrew, this first chucking surface not running parallel to the longitudinal axis of the shank.

BRIEF DESCRIPTION OF THE DRAWINGS

Preferred embodiments of the invention will now be described in detail below with reference to the accompanying drawings, in which:

FIG. 1 is an elevation, partially in section, of a tool-holding device with a boring head inserted, FIG. 2 is an elevation, partially in section, of a tool-holding device with an extension, FIG. 3 is a longitudinal section through part of the tool-holding device and the tool support in a second embodiment of the invention, FIG. 4 is a longitudinal section through a third embodiment of the invention.

DETAILED DESCRIPTION OF THE PRESENTLY PREFERRED EMBODIMENTS

Figure 5:
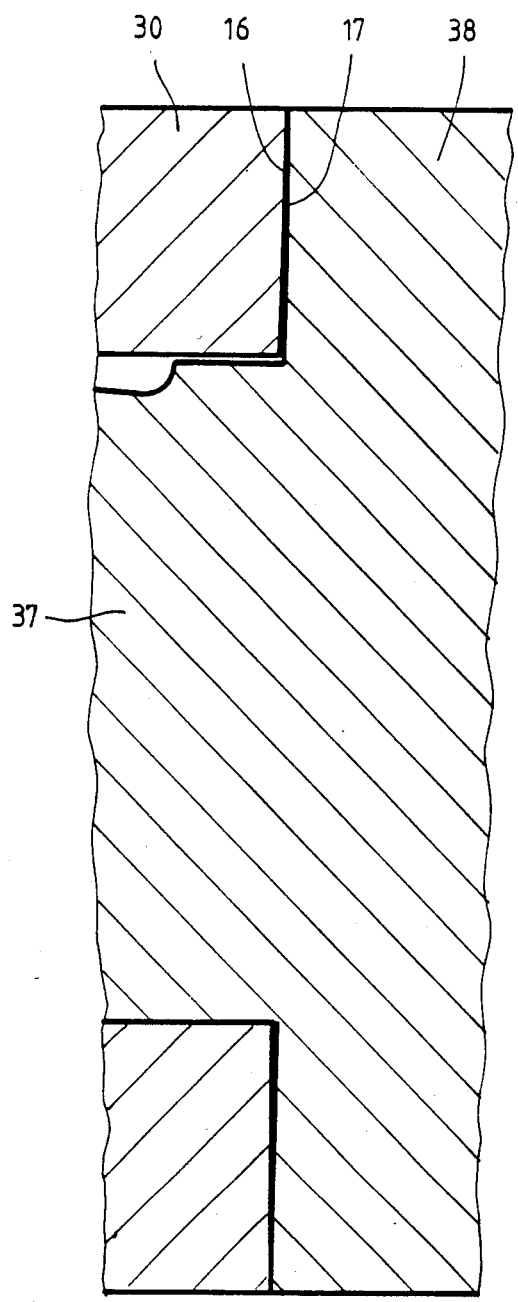
FIG. 5 is a longitudinal section through a fourth embodiment of the invention.

The tool-holding device 1 shown in FIG. 1 comprises a mounting cone 2 to be inserted in the tool-holding fixture of a machine (not shown). Connected to the mounting cone 2 is a socket 3 which is preferably cylindrical. The socket 3 has a bore 4 running parallel to its longitudinal axis. In the wall of the socket 3 is a bore 5 running at an angle to the longitudinal axis of the socket 3. The longitudinal axis of the bore 5 deviates by a few degrees from a line perpendicular to the longitudinal axis of the socket 3. Inserted in the bore 4 is the shank 6 of a boring head 7. Ground into the shank 6 is a longitudinal surface 8 which deviates by a few degrees from the longitudinal axis of the socket 3 so that the longitudinal surface 8 comes to be positioned exactly perpendicular to the longitudinal axis of a setscrew 9 driven into the bore 5. A further surface 10 provided on the shank 6 forms an angle of about 45° with the longitudinal axis of the shank 6. The setscrew 9 is provided at the bottom with a beveled or faceted suface 11 which acts upon the surface 10. There is preferably a groove 12 in the boring head 7 for inserting a follower pin (not shown). Furthermore, bores are provided in the mounting cone 2, in the socket 3, and in the boring head 7, forming a duct 13 for a coolant. Compared with conventional ducts in tool-holding devices, the duct 13 has the advantage of not running along the longitudinal axis, so that individual parts of the device 1, such as the bore 4 and the shank 6, cannot be wetted by the coolant. The portion 14 of the duct 13 running at an angle to the longitudinal axis is sealed by a stopper 15.

The longitudinal surface 8 on the shank 6 is preferably inclined by about 2° relative to the longitudinal axis of the tool-holding device 1. When the setscrew 9 is tightened, a force component is produced which pulls the chucked tool support—in the present instance the boring head 7—into the bore 4 by its shank 6, thereby ensuring faultless force-locking and a bias between the end face 16 of the socket 3 and the end face 17 of the tool support, here the boring head 7.

Figure 6:
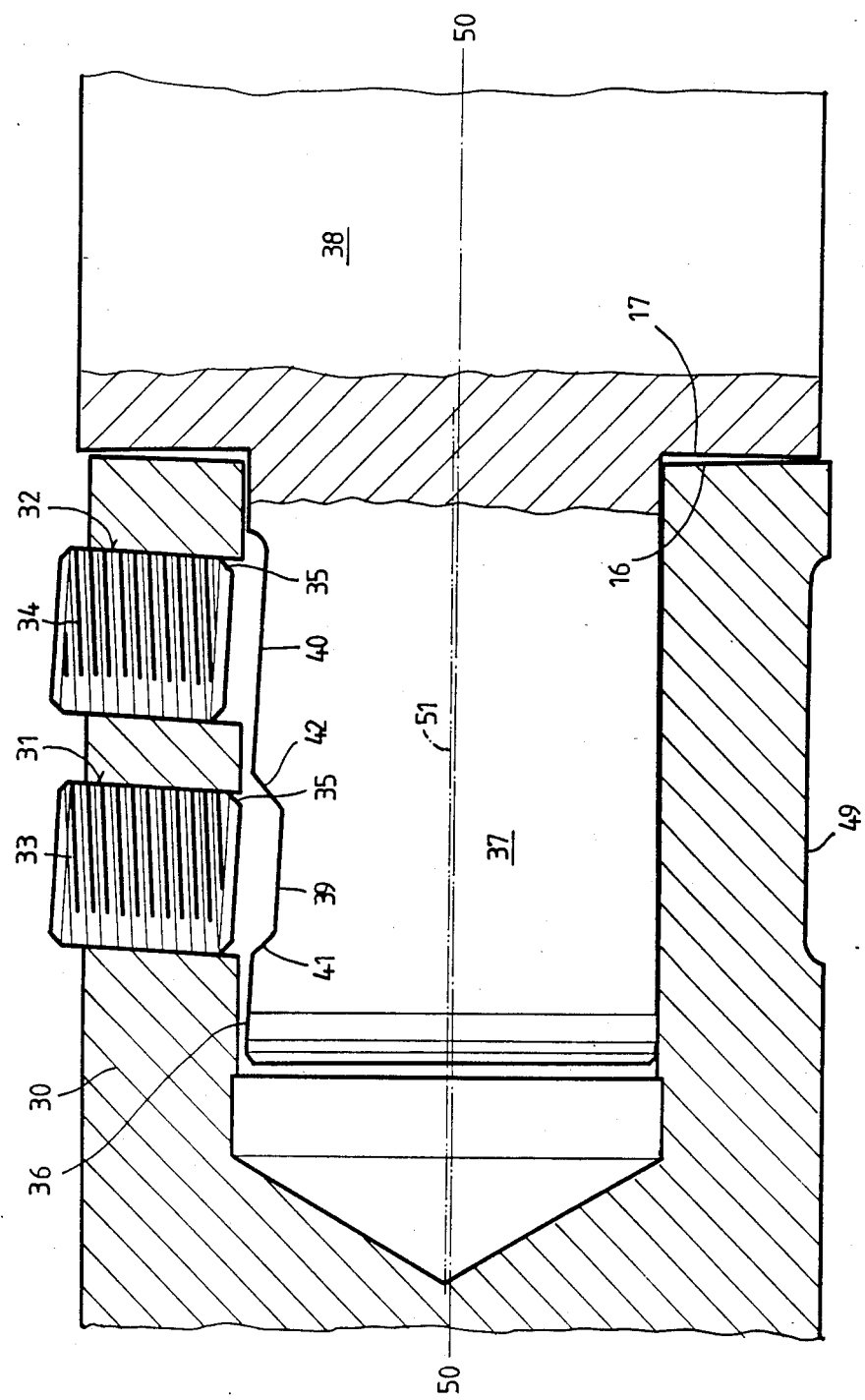
FIG. 6 is a partial longitudinal section through a fifth embodiment of the invention.

In order to ensure optimal force-locking and biasing of the end faces 16 and 17, at least one of the latter is preferably made with a concave tolerance of 0.001 to 0.003 mm, as shown in FIG. 5. Since the shank 6 is somewhat deformed when the setscrews are tightened, and its longitudinal axis thus deviates somewhat from that of the socket 3 in the fixed state, the bore 4 is preferably not made exactly concentric with and parallel to the longitudinal axis of the socket 3. This is also shown in FIG. 5. This deviation of the longitudinal axis of the bore 4 from that of the socket 3 is made such that the tool support—here the boring head 7—when clamped in has a minimal wobble of a few hundredths of a millimeter. The wall of the socket may include a balancing surface, as shown in FIG. 6.

In FIG. 2, an extension part 18 with a shank 19 having a cylindrical outer surface is inserted into the bore 4 of the tool-holding device 1. On the cylindrical outer surface of the shank 19, a surface 20 inclined by a few degrees relative to the longitudinal axis of the socket 3 is likewise ground in the vicinity of the end of the setscrew 9. The end 21 of the extension part 18 remote from the shank 19 has a bore 22 therein. Running at an angle to the bore 22 is a threaded bore 23 for receiving a setscrew 24. A boring head 25, smaller than the one appearing in the embodiment of FIG. 1, has a shank 26 which likewise includes on its cylindrical portion in the vicinity of the setscrew 24 a ground-in surface deviating by a few degrees from the longitudinal axis of the extension part 18. Furthermore, an additional surface, inclined at an angle of about 45° to the longitudinal axis, is provided on the shank 26 in the vicinity of the end of the setscrew 24. As regards end face 16 of the socket 3 and the annular end face 27 of the extension part 18, the same applies as has already been explained with reference to FIG. 1. On a cylindrical portion 28 of the extension part 18, in the region of the annular end face 27, a groove 29 for receiving a follower pin (not shown) may similarly be provided.

Various types of interchangeable tool supports may be used with the tool-holding device described, especially boring heads, milling spindles, drill and milling jig sleeves, collet chucks, end mill holders, drill chucks, and boring bars, as well as reductions and extensions. The annular end face disposed about the shanks of these tool supports is preferably casehardened and ground, its outside diameter preferably corresponding at least to that of the end face of the socket of the tool-holding device.

FIG. 3 is a longitudinal section through part of the tool-holding device and part of the tool support of another embodiment of the invention. In a socket 30 of the device there are two threaded bores 31 and 32, the longitudinal axes of which are inclined at an angle of 0° to about 5° to a straight line perpendicular to the longitudinal axis of the socket 30. Setscrews 33 and 34 inserted in the bores 31 and 32 each have a beveled or faceted surface 35 at the bottom. The beveled or faceted surface 35 is part of the surface of a geometric cone having an aperture angle of about 90°. The shank 37 of a tool support or an extension 38, inserted in a longitudinal bore 36 in the socket 30, has two surfaces 39 and 40 milled on and running perpendicular to the longitudinal axes of the setscrews 33 and 34, consequently also forming an angle of 0° to about 5° with the longitudinal axis of the shank 37. Moreover, at each side of the surface 39, which is the rearward one of the two surfaces 39 and 40 two further surfaces 41 and 42 are milled on, each forming an angle of about 45° with the surface 39. Surfaces 39, 41, and 42 form a transverse chucking groove. When the setscrew 33 is tightened, as soon as the beveled or faceted surface 35 at the bottom of the setscrew 33 comes in contact with the surface 41 (which serves as a first chucking surface) of shank 37, a force component K1 is produced, which can be split up into two components K2 and K3 perpendicular to each other. Component K3 may in turn be split up into two components K4 and K5, the latter of these running parallel to the longitudinal axis of the shank 37 and causing it, hence the tool support or extension as well, to be drawn into the longitudinal bore 36. In order to fix the tool holder securely in the tool-holding device, the setscrew 34 is also driven in, likewise bringing about, through cooperation with the surface 40 (which serves as a second chucking surface), a force component parallel to the longitudinal axis of the shank 37, thus additionally securing the tool support or extension in the longitudinal bore 36 of the tool-holding device.

In the case of smaller tool-holding devices, provision may be made for only the rear setscrew 33 instead of both setscrews 33 and 34, if need be. Contrary to prior art devices, no precise bore must be provided for in the shank to receive the setscrew. The milling accuracy suffices when producing the oblique first and second surfaces on the shank. No grinding is necessary.

The distance between rear setscrew 33 and the end faces relative to surface 41 must be exactly right for the purpose of optimal force-locking between end faces 16 and 17. Considerable axial force is produced by means of two easily manipulated setscrews. Adequate resistance to torsional stress during heavy roughing work and exact radial fixation of the chucked tool support are ensured.

In the embodiment illustrated in FIG. 4, two threaded bores 43 and 44 are provided in the socket 30 of the tool-holding device, their longitudinal axes running perpendicular to that of the socket and hence to that of the longitudinal bore 36 in the socket 30. Two surfaces 45 and 46 are milled on the shank 37 of a tool support or an extension inserted in longitudinal the bore 36, these surfaces running parallel to the shank 37 and perpendicular to the longitudinal axes of the setscrews 33 and 34 driven into the threaded bores 43 and 44. Milled on each side of the rear surface 45 are two further, inclined surfaces 47 and 48, each forming an angle of about 45° with the surface 45. When the rear setscrew 33 is tightened, the beveled or faceted surface 35 at the bottom of the screw, upon coming in contact with the inclined surface 47, produces as in the embodiment of FIG. 3 a force component parallel to the longitudinal axis of the shank 37, so that this shank, and thus the tool support or the extension as well, is drawn into the longitudinal bore 36. The front setscrew 34 is also tightened for additional fixing of the shank.

What is claimed is:

1. A tool-holding device of the type having a mounting portion, a socket connected to said mounting portion, and one or more setscrews, said socket having a wall and an end face and including a first bore for receiving the shank of a tool support or the like and one or more further bores passing through said wall, and said setscrews being respectively disposed in said one or more further bores, wherein the improvements comprise:
    (a) one or more said setscrews each having a beveled or faceted surface at the end thereof intended to be situated nearest said shank and
    (b) said end face of said socket being concave.

2. The device of claim 1, comprising two said further bores disposed parallel to one another and two said setscrews respectively disposed in said two further bores.

3. The device of claim 1, wherein the longitudinal axis of each of said further bores forms an angle of from 0° to about 5° with a straight line perpendicular to the longitudinal axis of said socket.

4. The device of claim 1, wherein the longitudinal axis of said first bore does not coincide with the longitudinal axis of said socket.

5. The device of claim 1, wherein the longitudinal axis of said first bore is not parallel to the longitudinal axis of said socket.

6. The device of claim 1, wherein said wall of said socket includes a balancing surface.

7. The device of claim 1, further including a coolant duct running within said mounting portion and said socket, a part of said coolant duct running within said socket and being situated between said wall of said socket and said first bore.

8. A tool-holding device of the type having a mounting portion, a socket connected to said mounting portion, and at least two setscrews, said socket having a wall and an end face and including a first bore for receiving the shank of a tool support or the like and at least two further bores passing through said wall, and said at least two setscrews being respectively disposed in said at least two further borres, wherein the improvement comprises one or more of said at least two setscrews each having a beveled or faceted surface at the end thereof intended to be situated nearest said shank, said at least two further bores being disposed parallel to one another, two of said at least two setscrews being respectively disposed in said at least two further bores, the longitudinal axis of each of said at least two further bores forming an angle greater than 0° to about 5° with a straight line perpendicular to the longitudinal axis of said socket and said end face at said socket being concave.

9. The device of claim 8, wherein the longitudinal axis of said first bore does not coincide with the longitudinal axis of said socket.

10. The device of claim 8, wherein said wall of said socket includes a balancing surface.

11. A tool support for use with a tool-holding device, of the type having an end face and a shank intended to be inserted into a bore of said tool-holding device, wherein the improvement comprises a first chucking surface formed on the outside of said shank for cooperating with a setscrew of said tool-holding device, said first chucking surface not running parallel to the longitudinal axis of said shank, and said end face being concave.

12. The tool support of claim 11, further comprising one or more additional chucking surfaces formed on the outside of said shank.

13. The tool support of claim 11, wherein said first chucking surface forms an angle of about 45° with the longitudinal axis of said shank.

14. The tool support of claim 12, wherein said one or more additional chucking surfaces each form an angle greater than 0° to about 5° with the longitudinal axis of said shank.

15. The tool support of claim 12, wherein said first chucking surface forms an angle of about 45° with each of said one or more additional chucking surfaces.

16. A tool support for use with a tool-holding device, of the type having an end face and a shank intended to be inserted into a bore of said tool-holding device, wherein the improvement comprises a first chucking surface formed on the outside of said shank for cooperating with a setscrew of said tool-holding device, further comprising one or more additional chucking surfaces formed on the outside of said shank, wherein said first chucking surface forms an angle of about 45° with the longitudinal axis of said shank, said one or more additional chucking surfaces each forming an angle of more than 0° to about 5° with the longitudinal axis of said shank and said end face being concave.

17. An extension or reduction part for use with a tool-holding device, of the type having a shank intended to be inserted into a bore of said tool-holding device, a socket, and one or more setscrews, said socket having a wall and an end face and including a first bore for receiving a tool support and one or more further bores passing through said wall, and said one or more setscrews being respectively disposed in said one or more further bores, wherein the improvement comprises a first chucking surface formed on the outside of said shank for cooperating with a setscrew of said tool-holding device, said first chucking surface not running parallel to the longitudinal axis of said shank, further comprising one or more additional chucking surfaces formed on the outside of said shank, wherein said first chucking surface forms an angle of about 45° with each of said one or more additional chucking surfaces and said end face is concave.

18. A tool-holding device comprising:
(a) a mounting portion;
(b) a socket connected to said mounting portion, said socket having:
 (i) a peripheral wall;
 (ii) a concave end face;
 (iii) a first bore leading from said end face for receiving the shank of the tool support or the like; and
 (iv) a second bore leading through said peripheral wall to said first bore; and
(c) a first setscrew received in said second bore, said first setscrew having a beveled or faceted surface at the end thereof adjacent to said first bore.

* * * * *